April 25, 1944.  R. L. MULLER  2,347,607
CALCULATING MACHINE
Filed May 25, 1934   4 Sheets-Sheet 1

Fig. 1.

INVENTOR
Robert L. Muller
BY
Rector, Hibben, Davis & Macauley
ATTORNEYS

April 25, 1944.  R. L. MULLER  2,347,607
CALCULATING MACHINE
Filed May 25, 1934   4 Sheets-Sheet 3

Fig.3.

INVENTOR
Robert L. Muller
BY
Rector, Hibben, Davis & Macauley
ATTORNEYS

Patented Apr. 25, 1944

2,347,607

UNITED STATES PATENT OFFICE 2,347,607

CALCULATING MACHINE

Robert L. Muller, Detroit, Mich., assignor to Burroughs Adding Machine Company, Detroit, Mich., a corporation of Michigan Application May 25, 1934, Serial No. 727,411

15 Claims. (Cl. 235—60)

This invention relates to a calculating machine and is particularly concerned with certain features that adapt such a machine to bookkeeping work in a bank.

An increasing number of banks are installing what is known as "metered service," that is, they charge each customer, or depositor, for banking service in accordance with the number of items handled by the bank. The majority of these items are checks but charges may also be made for other items. Such a system necessitates keeping a record of the number of the items handled for each customer.

It is desirable to count the items and to make a record of the count during bookkeeping operations. Obviously, a counting mechanism that counts each operation of a calculating machine will not suffice because all of the machine operations do not correspond to chargeable items, i. e., some of the machine operations may be blank operations, totaling operations, etc. Therefore, if the count is to be kept during bookkeeping operations it is necessary to have a machine that will automatically discriminate in such a way as to count only the items that should be counted, and yet one that will be flexible enough to permit the operator to manipulate it to perform various calculating operations that may be required. The present invention is directed to a solution of this problem and particularly to a solution that enables a calculating machine already in existence to accomplish the result without the addition of special item counting devices and without any substantial alterations in the machine construction.

The general object of the invention is to provide an improved calculating machine.

A more particular object is to provide a calculating machine that will count and keep a record of the items for which a customer should be charged under a metered service system of banking charges.

A further object is to provide a mechanism that will enable the above results to be accomplished in a known type of bookkeeping machine without requiring the addition of special counting mechanism and without making any substantial alterations in the machine construction.

A still further object is to provide a machine that will enable both a positive and a negative total to be taken from different portions of a registering mechanism during the same machine operation.

Other and more particular objects will appear from the following specification and drawings.

An embodiment of the invention is shown in the accompanying drawings, in which.

The invention will be most easily understood by first explaining a few examples of work that the machine must be capable of performing.

EXAMPLES OF WORK

Figures 4, 5, 6:
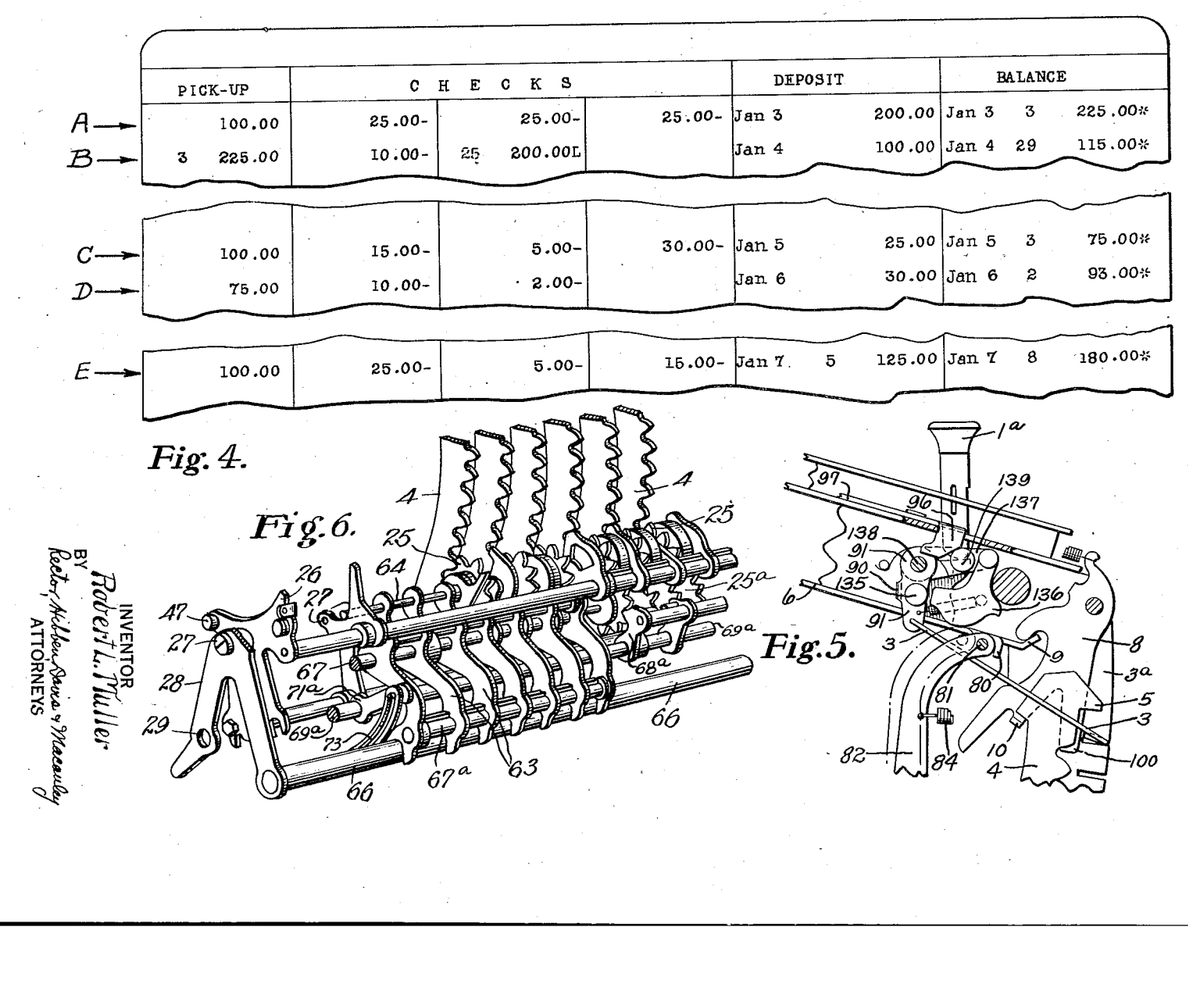
Fig. 4 shows a group of fragments of entry sheets illustrating several examples of work capable of being performed by a machine embodying the present invention.
Fig. 5 is a view similar to Fig. 2 and illustrating a portion of the mechanism shown therein of a slightly modified construction.
Fig. 6 is a partial perspective view showing the counter frame assembly.

Referring to Fig. 4 the first example includes two transactions A and B. In the first transaction a pickup or balance of $100.00 is entered in the first columnar position. This item is not one to be counted, and the item counting mechanism is automatically disabled, as will be later explained. After this entry the carriage tabulates automatically to columns 2, 3 and 4 where entries corresponding to three $25.00 checks are made and are deducted from the old balance. The machine is conditioned for subtraction in each of these columns and, since each of the three checks is to be counted, the item counting mechanism is active in each column. But it is not desired to print the results of the count in these columns, and such printing is prevented as will be later explained. The carriage then automatically tabulates to column 5 where a deposit of $200.00 is entered after which the carriage tabulates to column 6 where the final balance automatically arrived at by the machine is printed to complete the transaction. Neither the "deposit" nor the "balance" operation should be counted and hence the item counting mechanism is disabled in both of these columns in so far as the automatic count is concerned. But it is desired to print the number of chargeable items in the postings that have just been made and, accordingly, when the new balance is printed in column 6, the item counting section of the machine is automatically totaled at the same time that the amount section is totaled, and the printing means for both sections operates, with the result that the number of items to be charged is printed along with the new balance.

It will be recalled that the three checks that were entered are subtract items and that, during their entry, the register or crossfooter of the machine was in subtract position. The count of the items should, however, be a positive count in so far as the final condition of the item counter is concerned. If such count were to be registered subtractively, then, when totals are taken positively in the sixth column, the total of the count would be the complement of the actual number. The present invention provides for such a contingency, that is, a novel mechanism has been provided such that, when an item is subtracted from the crossfooter, the net result in the item counting section is that said count section registers a unit positively even though the crossfooter was in subtract position at the time of the machine operation.

In entering transaction B the old balance or pick-up of $225.00 is first entered in the keyboard in column 1 and at the same time the total count of chargeable items, namely 3, is also entered on the amount keys or indexing devices for the item counter of the keyboard. In other words, the item counter is "charged" with a predetermined number to which is added subsequent items to be counted. No automatic count of the item $225.00 should occur in column 1 and the item counter is inactive as far as automatic counting is concerned. When the machine is operated in column 1 of transaction B, the count of 3 is added in the count section and printed and the amount $225.00 is added in the amount section and printed, after which the carriage automatically tabulates to column 2. In column 2 a check is entered and deducted in the register and a count of 1 is automatically added in the count section after which the carriage automatically tabulates to column 3. While the item is counted in column 2, it is not printed. In column 3 an amount of $200.00 is entered, which represents the total of a list of 25 checks that have been grouped into one amount. It is desired to add this number of items to the number already counted—that is, 3+1+25=29. To accomplish this, the figure 25 is entered on the indexing devices or amount keys of the count section so that when the machine is operated in this column, 25 will be added or "charged" into the item counter. In the example illustrated in Fig. 4, the count of 25 is indicated in dotted lines in the column 3 but, actually, is not printed. No automatic count should occur during this operation because that would result in counting the group of checks as an item. Accordingly, a special key has been provided which, when depressed, disables the automatic count and causes a special character, such as L (Fig. 4) to be printed along with the total of the checks ($200.00) thereby indicating that this amount represents the total of a list of checks. The carriage then automatically tabulates to column 4 where, in the present instance, nothing is entered, and then to column 5 where a deposit of $100.00 is entered, after which the carriage tabulates to column 6 where the total of $115.00 is printed, with the total count of 29, meaning 29 chargeable items.

Transactions C and D represent a slightly different system of keeping a record of the chargeable items and in these transactions the balance or pickup of the count of the previous transaction is not entered in the first column. Instead, of the total of the count is printed only in column 6 with the final total of each series of transactions. When this system is used the separate totals of the count of each series of chargeable items must be added to obtain a total of the chargeable items counted. This extra operation is somewhat offset by the fact that the operator does not have to enter a pickup or balance of the items each time a new series of transactions is started. In other respects the entries are the same as in transactions A and B.

Transaction E illustrates another series of transactions which the machine is capable of performing. In this series of transactions the deposits as well as the checks or deductions are also counted but the deposits are not counted automatically, that is, they must be entered in the count section by the operator directly from the keyboard. In the illustrated transaction an old balance or pickup of $100.00 is entered in column 1 after which the carriage tabulates to columns 2, 3, and 4 in which deductions or checks of $25.00, $5.00 and $15.00, respectively, are entered. As before, the pick-up in column 1 is not counted, but the subtract items in columns 2, 3 and 4 are counted but not printed. From column 4 the carriage automatically tabulates to column 5 where a deposit of $125.00 is entered which deposit represents five items. In this column, the item counting mechanism is not conditioned to count automatically, but the operator may enter the count of 5 by indexing said amount on the amount keys so as to "charge" this number into the item counter when the machine is operated. This count of 5 is added to the count already in the item counter and is printed under the control of the indexing keys for the items counter. After this column the carriage automatically tabulates to column 6 where the total of $180.00 is printed with the count of 8 which is the sum of the three checks plus the five deposit items giving the total number of items regardless of whether they are deductions or additions.

From the above it will be clear that, in order to count and keep a record of the number of items for which a customer is to be charge under a metered service plan, the machine must be capable of meeting a wide variety of conditions and it must be sufficiently flexible to enable the operator to enter, for example, a list of items and to manipulate it in various ways to perform the necessary bookkeeping operations and, at the same time, keep a proper record of the number of items for which the customer must be charged.

GENERAL MACHINE FEATURES

The invention is shown applied to a Burroughs calculating machine. The general construction of this machine is well known and it will be only briefly described here, reference being made to Patents Nos. 1,778,506 and 1,911,768 for details of construction.

The machine has a plurality of amount keys upon which items may be entered. In machines used for banking work there are usually seventeen rows of keys making up what is known as a "17-bank" machine. The first three banks on the left, viewing the machine from the front, are generally used to enter dates and will be referred to as the "date section." The banks on the right are used to enter the amounts of transactions and will be referred to as the "amount section." Sometimes three or four banks immediately to the right of the date section may be used to enter the folio numbers of accounts and the amount section can, in such cases, include as many banks as circumstances permit.

As each amount key 1 (Fig. 2) is depressed its stem rocks the small bell crank lever 2 which pulls the stop wire 3 into position to arrest the downward movement of its actuator rack 4 by engagement with shoulder 5. There are a plurality of these actuator racks of different orders corresponding to the banks of amount keys, said actuator racks being closely associated as a group and being adapted to be released for movement during a machine cycle under the control of the indexing devices, or, in the case of total taking, under the control of the register. When a key 1 is depressed its bell crank lever 2 moves a key-locking slide 6 rearward where it is latched by a detent 7 (Fig. 1) until released near the end of the machine operation. Rearward movement of the key-locking plate 6 for a given bank rocks the latch 8 for that bank clockwise by engagement therewith by its lug 9 to release the actuator rack for said bank. The actuators are prevented from descending when a machine operation occurs in which no keys are depressed by means of the latches 8 which have lugs 10 that engage the upper ends of the racks and prevent downward movement thereof until released upon rearward movement of slide 6 and corresponding clockwise movement of latch 8.

Figure 1:
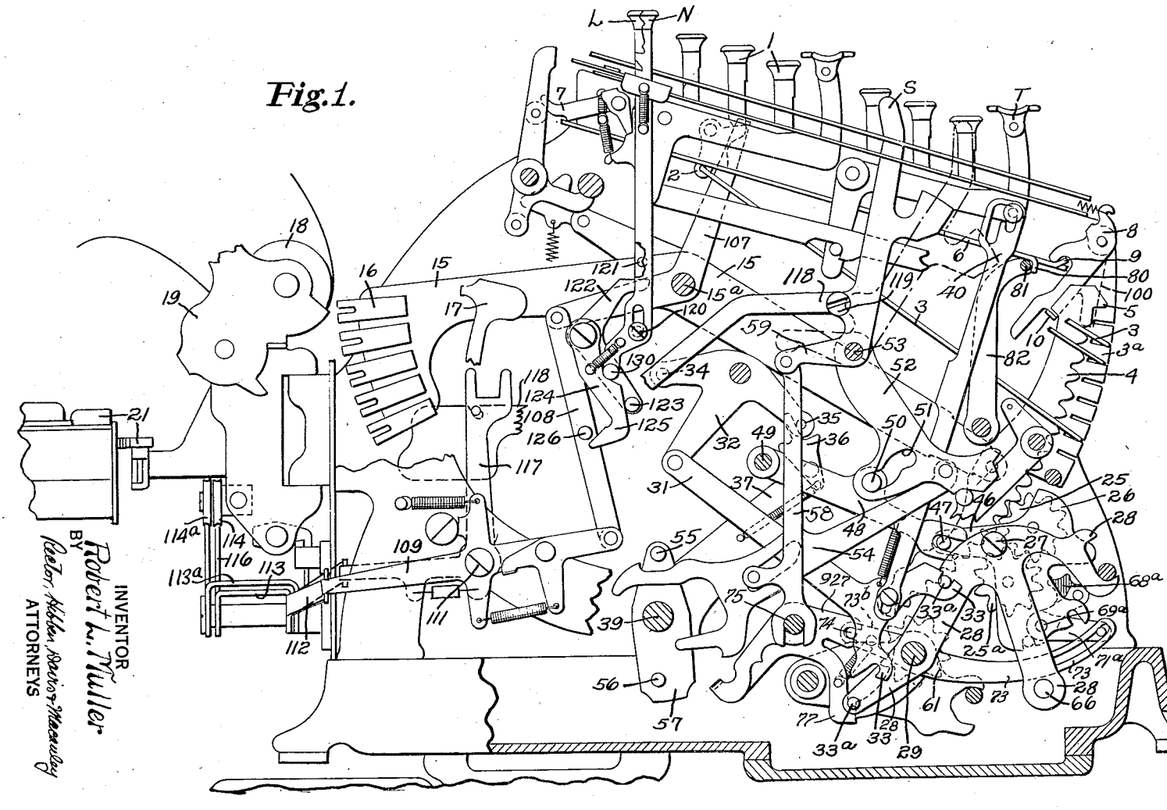
Figure 1 is a left side elevation of a calculating machine embodying this invention and with the casing and part of the side frame removed to more clearly show the novel structure.

During a machine operation following depression of one or more amount keys, the racks are allowed to descend until stopped by engagement of the index wires after which the racks are returned to their normal Fig. 1 position. The racks and associated parts comprise a differential actuating means for rotating the register pinions.

A printing means is provided for printing the items entered in the machine as well as the totals in the registering mechanism. The actuators include arms 15 pivoted at 15A which have the racks 4 mounted on one end and printing type 16 on the other end. The printing type are thus differentially positioned at the same time that the actuator racks are positioned, and, at an appropriate time during the machine cycle, the printing means operates to fire hammers 17 against the type to make an impression on paper held about the platen 18.

Columnar-printing control means is provided in the form of a traveling paper carriage 19 which supports the platen 18 and which is controlled by a tabulating mechanism. Normally, the traveling paper carriage moves from one column to the next during the latter part of each cycle of machine operation. Said carriage may be returned by a carriage return mechanism 21. The tabulating mechanism and said return mechanism, together with the paper carriage, govern the column in which printing shall occur. The tabulating and return mechanism are described in detail in Rinsche 1,580,534.

A main registering mechanism is provided which is capable of addition and the accumulation of positive totals or of subtraction and the accumulation of negative totals. When addition is performed, an engagement between the actuator racks and the registering mechanism is caused in one relation while, when subtraction is performed, an engagement is caused in another relation.

The registering mechanism comprises a plurality of register pinions 25 which, for purposes of convenience, will be called the "add" pinions. These pinions are carried by a register tumbling frame 26 pivoted at 27 to side arms of a main frame 28 which are in turn pivoted at 29 to each side of the machine. The entire register assembly sometimes known as the crossfooter is adapted to be rocked to cause the pinions to engage and disengage the actuator racks.

In performing addition the racks 4 are first allowed to descend to differential positions after which the pinions 25 are rocked into engagement with them prior to their return to normal. The racks are then returned upwardly to rotate the pinions in an add direction to register the amount that has been entered on the amount keys.

The register frame is moved so as to bring the register pinions into and out of mesh with the racks 4 during each machine operation by means of a lever 31 pivoted to the center-arm of a three-arm lever 32 carried by the left-hand side frame. Lever 31 terminates in a bifurcated end having a fork 33 on each end selectively engageable with a pair of studs 33a carried by the register frame arms 28, the two outside arms of lever 32 having two studs 34 and 35 located at opposite sides of the pivotal point of the lever in position to engage a pass-by pawl 36 carried by arm 37 which is fastened to the main operating shaft 39 of the machine. When the machine is given a cycle of operation, shaft 39 is rocked counterclockwise and then returned clockwise and, through the pass-by pawl 36, causes the register frame and register pinions to be disengaged from the racks during the forward machine stroke, while the racks are descending, and engaged with the racks during the return stroke of the machine when the racks are rising to normal position.

During totaling the condition is reversed, that is, when the total key T is depressed the lever 31 is lowered by link 40 until its lower fork engages lower stud 39a which is below the pivot center 29 of the frame arms 28 thus reversing the movement of the register frame and causing the register wheels to engage the racks on the forward stroke of the machine, that is, when the racks are descending and disengaging the racks upon the return or upstroke of the racks.

For the purpose of enabling direct subtraction to be performed, a set of intermediate pinions 25a is provided which, for purposes of convenience, will be called the "subtract" pinions. In performing subtraction, these subtract pinions are engaged with the actuator racks at the same time during a cycle of machine operation as when addition is performed, that is, the racks are first allowed to descend to differential position after which the subtract pinions 25a are engaged with them, and then, the racks are returned to normal to rotate the pinions. It will be clear that, if the subtract pinions 25a are engaged with the racks instead of the add pinions, the add pinions will be rotated in a direction reverse to that in which they are rotated when the add pinions are engaged directly with the racks.

In order that the relation of the engagement of the registering mechanism and the racks may be changed, that is, in order that either the add or the subtract pinions may be engaged with the racks, the frame 26, which carries both pinions 25 and 25ª, is pivoted or "tumbled" about pivot 27, that is, within arms 28. In other words, the frame 26 is "tumbled" so that when the frame 28 is rocked to engage the registering mechanism with the racks, either the add or the subtract pinions will be engaged depending upon the position of the frame 26 within the frame 28.

The position of this frame in tumbling is determined by the position of an add-subtract lever S, as follows:

Frame 26, which supports both the add pinions 25 and the subtract pinions 25ª, is provided with a rearwardly extending arm 46 having a stud and slot connection 47 with an arm 48 (Fig. 1) pivoted at 49 to the left side frame of the machine. Arm 48 is also provided with a stud 50 which is in constant engagement with a cam slot 51 of a lever 52 pivoted at one end 53 to the machine frame. Lever 52 is connected to one end of a pitman arm 54 the other end of which is bifurcated and extends into position to engage studs 55 and 56 carried by a plate 57 secured to main shaft 39. Pitman 54 is controlled by the add and subtract control lever S through a link 58 attached to an extending arm 59 of the control lever S as shown in Fig. 1. The arrangement is such that when the control lever S is moved to its add position as shown in full lines in Fig. 1 and the machine is given a cycle of operation, the frame 26 is moved and retained in its counterclockwise or add position to cause pinions 25 to engage the racks, and when the control lever S is moved forward to the dot and dash subtract position and the machine is given a cycle of operation, the frame is rocked clockwise to the subtract position in which position pinions 25ª engage the racks. The subtract lever may be manually operated, or the machine can be automatically conditioned for subtraction under the control of the carriage, as described in detail in said Pasinski Patents 1,778,506 and 1,911,768, and as will be briefly described later.

As previously stated a totaling mechanism is provided controlled by a total key T. In taking totals, depression of the total key releases the racks from the zero stop latches in the well-known manner and the registering mechanism is engaged with the actuator racks before they descend and these racks then descend under the control of the registering mechanism, each rack being arrested in a position corresponding to the zero position of its pinion, suitable stops being provided for arresting the pinions in zero position.

Positive totals are taken by causing a total taking engagement of the registering mechanism and racks in addition relation, that is, the pinions 25 are in engagement with the racks during their descent.

True negative totals may be taken by causing a totalizing engagement between the racks and registering mechanism in a subtraction relation, that is, the subtract pinions 25ª are engaged with the actuator racks before their descent. In order that this total may be a correct negative total, a "fugitive 1" mechanism is provided, the same being partly illustrated in Fig. 2 at 60 and being of the type illustrated in Rinsche Patent No. 1,172,484.

A tens transfer mechanism is provided for the main registering mechanism, the same being described in detail in said Rinsche patent, and portions of which are illustrated herein as will be later explained.

The machine may also be provided with another registering mechanism 61 which may be in the form of a single register as shown in Patent No. 1,778,506, or a plurality of registers as shown in Patent No. 1,911,768. These registers and the controls therefor are illustrated and described in detail in said patents to which reference is made.

AUTOMATIC COUNTING MECHANISM

As previously mentioned, an important advantage of the present invention is that provision is made for automatically counting checks by the use of a known type of calculating machine without the addition of a special item counter and without any substantial change in the machine construction.

This is accomplished in the present invention by the use of the first four banks of the machine immediately to the right of the date section, which four banks are referred to herein as the "count" section.

Only add pinions 25 are provided for the four banks of the count section, and these pinions will be called the "count pinions," the remainder of the pinions being called "amount" pinions. The "count" pinions are not mounted in the tumbling or rocking sub-frame 26 but are carried by a very simple special frame comprising plate 63 (Fig. 2) rigidly fixed to the main register frame 28, said plates supporting the shaft 64 on which the add pinions are mounted. The tens-transfer mechanism is split as between the four banks of the count section and the remainder of the machine, the tens-transfer mechanism for the count section cooperating with the count pinions 25 only. The "fugitive 1" mechanism is operative for the amount section only and if a negative total lock such as disclosed in Pasinski 1,778,506 is desired it is mounted on the left-hand bank of the amount section.

Indexing devices are provided for the count section in the form of keys which control stops that govern the differential movement of the count-section actuators. The count section also has a printing means which is split from the main portion of the printing mechanism so that ciphers will not be carried to the right from the count section into the amount section. The automatic control of hammer block extends to the count section so that its printing mechanism can be controlled by the paper carriage.

The plates 63 are held in spaced relation by cross shafts 67 and 67A, and said plates are supported for pivotal movement to enable the counting pinions to be engaged and disengaged with the actuators by having their lower forked ends rockably mounted on the fixed shaft 66 which extends across the machine. The plate 63 adjacent the main register frame 28 is fixed to said register frame so as to move with it. Consequently, while the frame 26 is permitted to "tumble" and to cause either pinions 25 or 25ª to be engaged with the racks when the frame 28 is rocked toward the racks, the plates 63 which move with the frame 28 toward and from the racks will always carry pinions 25 of the count section into engagement with the racks each time frame 28 is moved toward the racks.

In other words, when the registering mechanism 28 is rocked to engage the register pinions with the racks, the pinions 25 in the count section will be engaged for addition no matter whether the add pinions 25 or subtract pinions 25ª of the remainder of the register engage the racks.

Means are provided to prevent rotation of both the "amount" and the "count" pinions while they are out of engagement with the actuator racks. The mechanism for preventing rotation of the "amount" pinions is the usual mechanism provided on the Burroughs machine disclosed in Rinsche 1,179,564. It includes arms or fingers 68ª (Figs. 1 and 6) fixed to a shaft 69ª journaled in the tumbling frame 26. These fingers have noses shaped to fit between the teeth of the pinions 25ª. The shaft 69ª, with the fingers 68ª, is governed by an arm 73 pivoted on the shaft 29 (Figs. 1 and 2) as presently will be explained. The "count pinions" are prevented from rotating by arms 68 (Fig. 2) fixed to a shaft 69 which is journaled in the plates 63 that are fixed in the main register frame. The shaft 69 with its arms or fingers 68 and the shaft 69ª with its fingers 68ª, are controlled as follows:

The arm 73 is connected through a crank 71ª (Figs. 1 and 6) with the shaft 69ª. Said arm 73 also has an upward extension 73ª provided with a stud and slot connection 72 with an arm 71 fixed to the shaft 69. The arm 73 also has a rearward extension 73ᵇ carrying a stud 74 positioned in a slot in one arm of a three-armed member 927 pivoted on a stationary shaft 75. The member 927 may be urged counterclockwise in Fig. 2 by a spring, not shown, but illustrated in said Rinsche patent although this spring is not absolutely necessary. Counterclockwise movement of the member 927 is limited by engagement of an abutment face 76 on the downwardly extending arm 77 of member 927 with an abutment face 78 on one of the levers 28 that carries the main register frame and which is pivoted at 29. When the register is in engagement with the actuator racks, the parts occupy the position of Fig. 2 where the fingers 68 and 68ª are out of engagement with the "count" and the "amount" pinions, respectively.

When the main register frame is rocked clockwise about shaft 29, the abutment face 78 on the lower end of the lever 28 (Fig. 2) engages the abutment face 76 and rocks the member 927 clockwise. This rocks the members 73ᵇ, 73ª and 73 counterclockwise and moves the crank 71 clockwise and the crank 71ª counterclockwise, the shafts 69 and 69ª with their respective fingers 68 and 68ª also moving clockwise and counterclockwise, respectively. The parts are arranged so that this action takes place immediately as the main register frame starts to rock clockwise so that the fingers 68 and 68ª engage the "count" and the "amount" pinions as they are moving out of engagement with the actuator racks.

Figure 2:
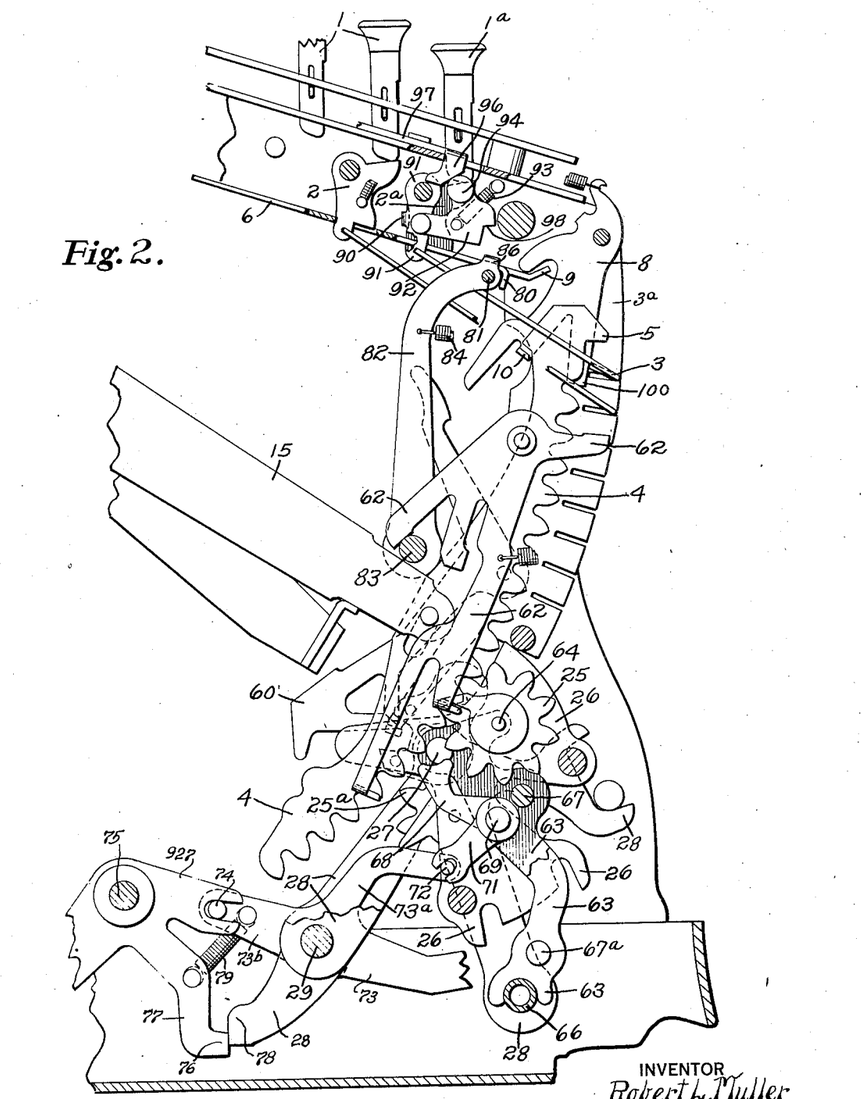
Fig. 2 is an enlarged detail of a portion of the mechanisms shown in Fig. 1.

As the lever 28 rocks the member 927 clockwise, the spring 79 is stretched because the two studs to which it is attached are moved away from one another. The spring 79 thus urges member 927 counterclockwise.

As the register frame approaches the end of its movement in a clockwise direction, the abutment face 78 on the lever 28 passes above the abutment face 76 thereby freeing the arm 77 of member 927 which member is immediately rocked counterclockwise by its spring. This tends to rock the arms 73ᵇ, 73 and 73ª clockwise to move the fingers 68 and 68ª away from the pinions. But the member 927 can move counterclockwise only a limited distance until the side of its lower arm 77 engages the abutment face 78. This movement is not effective to move the fingers 68 and 68ª from engagement with the pinions because, at that time, the shafts 69 and 69ª are being carried by the register frame toward positions forward and downward from that shown for shaft 69 in Fig. 2. In this position of the parts 77 and 28, the arm 77 of member 927 forms a detent for holding the lever 28 of the register frame in its clockwise position.

When the register frame is again returned counterclockwise to engage the pinions with the actuator racks, the cam end of the lever 28 swings counterclockwise downwardly and forwardly. It swings past the bent end of arm 77 to thereby unlatch itself and, as it continues its movement, it frees the member 927 for movement counterclockwise under the urge of its spring to move the arms 73ᵇ, 73 and 73ª clockwise to move the fingers 68 and 68ª away from the register pinions. The parts are proportioned so that the fingers are disengaged just as the pinions engage the actuator racks.

*Control of automatic count*

As was previously explained in connection with the examples of work shown in Fig. 4, the machine is constructed to automatically count 1 or add a unit in the count section of the machine each time an item is entered upon the amount section of the keyboard in predetermined columnar positions of the carriage, without attention on the part of the operator. A means for controlling the counting mechanism in response to the entry of an item will now be described.

Each of the locking slides 6 (Fig. 2) that extends under each bank of keys of the amount section of the keyboard and is moved rearwardly thereby is provided with a downwardly extending tongue 80 which engages across shaft 81 extending across the width of the amount section of the keyboard and carried by arms 82 secured to a shaft 83. The shaft 81 and arms 82 are urged clockwise by springs 84. Upon depression of any amount key in the amount section and resultant rearward movement of the associated slide 6 the downward lip 80 thereof engages shaft 81 and moves it rearwardly. In the present embodiment, the left arm 82, which is located between the highest order bank of the amount entering section and the units bank of the count section, is provided with a laterally extending lip 86 for a purpose later to be described.

Movement of a slide 6 on depression of any amount key in the amount section is utilized to set the index wire 3 of the units bank of the count section so that a count of 1 is indexed for entry into the item counter during each machine operation following the depression of an amount key provided the automatic count mechanism is not otherwise controlled, as will be presently explained. For this purpose the units key 1ª in the first bank of the counting section operates a slightly modified crank lever 2ª (Fig. 2) taking the place of the normal crank lever 2. Crank lever 2ª is not provided with an index wire at its lower end as are all the other levers 2, but instead engages a lug 90 of an auxiliary lever 91, to which the index wire 3 for that key is attached. Pivoted to the auxiliary crank 91 is a pawl 92 normally urged counterclockwise by a spring 93. Pawl 92 carries a stud 94 engageable by a cam 96 formed on a slide 97 slidably mounted on the lower keyboard plate. Pawl 92 is also provided with a notch 98 at its forward edge positioned to engage the lip 86 of the arm 82 under certain conditions.

The slide 97 normally occupies the position shown in Fig. 2. With the slide in this position, if the arm 82 is rocked rearwardly by the depression of an amount key, said arm will not affect the automatic counting mechanism but will pass under the pawl 92. Thus, it will be seen that while the indexing of an item in the amount section, no matter what that item may be, will move the arm 82 rearwardly for the purpose of indexing the counting mechanism, such indexing will not occur unless the slide 97 is forward of its Fig. 2 position and the cam 96 holds the pawl 92 in the path of the lip 86. Since, in the preferred construction, the carriage also indexes the machine for subtractions, it will be evident that there is an automatic control of the count for selected items such as subtract items.

When the slide 97 is moved forward cam 96 will engage stud 94 and rock pawl 92 clockwise about its pivot into the path of the lip 86. Under such conditions any movement of arm 82 caused by a movement of a slide 6 created by depression of any amount key in the amount section will rock the auxiliary crank 91 through pawl 92 and set the unit wire 3 for the count section.

The forward end of the stop wire moves into slots in plates such as the plate 3ᵃ shown in Fig. 2. There are two of these slotted plates for each bank, one on each side of and closely adjacent the actuator rack for said bank, as disclosed, for example, in Pasinski 1,778,506. Of the two slotted plates for any given bank, the left-hand plate, viewing the machine from the front, is positioned between the long shanks of the stop wires 3 and the actuator rack 4 of said bank, while the second plate is on the opposite side of the actuator rack and the short end of the stop wire is on the right-hand side of this second plate and in position to engage the arm 100 of the zero stop pawl for said bank. In Fig. 2, the slotted plates for the units order bank of the count section have been omitted in order that the actuator rack 4 and zero stop pawl 8 for said bank may be more clearly illustrated in full lines.

During an automatic count in the count section the unit key 1ᵃ is not operated and therefore its slide 6 is not operated and consequently the latch 8 for that bank is not moved to release the rack. Accordingly, provision is made to release the latch 8 so that the rack may drop to indexed position. For this purpose the latch 8 in the bank is provided with a downwardly extending arm 100 (Fig. 2) which projects into position to be engaged by the inturned end of the index wire 3 so that when the index wire is pulled rearwardly as occurs when the count is automatically added, the wire will engage arm 100 and rotate latch 8 clockwise about its pivot to release rack 4.

From the description thus far given, it will be apparent that when the slide 97 is in its forward position and any of the keys in the amount section are depressed, no matter whether in one or more banks, the machine will be preliminarily conditioned for automatic counting, i. e., the differential stop in the units bank of the count section will be set so that, as the machine is given a cycle of operation, a unit will be registered in the count section, and this unit will be registered additively no matter whether the item entered on the amount keys was an added or a subtracted item.

It will be understood from the foregoing description that the completion of the conditioning of the automatic counting mechanism is under the control of slide 97. The slide 97 is controlled by the paper carriage, as will now be explained.

Figure 3:
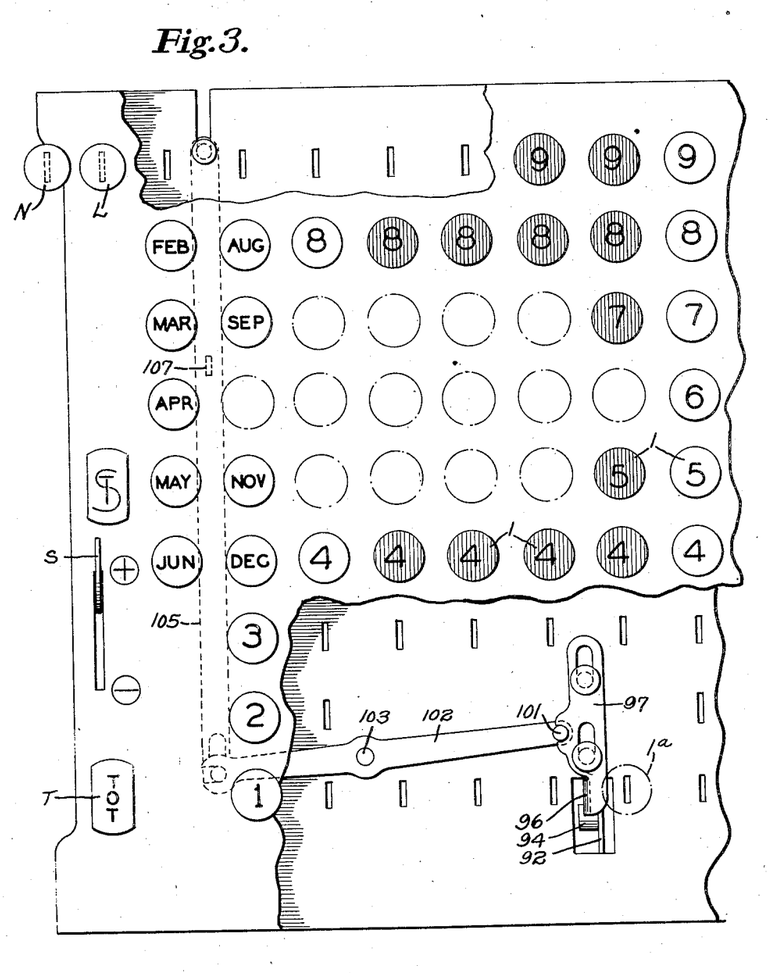
Fig. 3 is a plan view of the left side of the keyboard with portions cut away to show the novel mechanisms.

As previously stated the slide 97 is slidably mounted upon the lower keyboard plate and, as shown more clearly in Fig. 3, has a stud and slot connection 101 with one end of a lever 102 pivoted at 103 and having a stud and slot connection at its other end with a link 105, the latter link also being slidably supported by the lower keyboard plate. Link 105 is provided with a slot intermediate its end into which projects the upper end of a bell crank lever 107 (Fig. 1) pivoted at 15ᵃ and connected at its other end to a link 108. Link 108 connects this crank to a lever 109 pivoted to the machine frame at 111 and extending rearwardly where it engages the forked end of an arm 112 of a yoke 113.

When it is desired to automatically count the item entered in the machine in a particular columnar position of the paper carriage, the carriage is provided with a roller 114 positioned so that when the carriage is in the desired columnar position the roller engages an arm 116 of yoke 113 and swings the yoke and rocks lever 109 thereby rocking bell crank 107 which in turn moves slide 97 to cause its cam 96 to act upon stud 94 to condition the counting mechanism to operate automatically as previously explained. Where it is desired to have an automatic count in two or more adjacent columnar positions it is possible to provide a roller for each columnar position or to provide a skid which extends over the two columnar positions. For fully automatic operation of the machine for banking entries the subtract lever S is carriage controlled as shown in the Pasinski Patent 1,778,506. For this purpose a carriage roll 114ᵃ (Fig. 1) is employed which acts upon a yoke 113ᵃ and rocks a pivoted lever 117 connected to a link 118 attached at 119 to the subtract lever S.

In making the entries shown in Example B it is necessary for the operator, of course, to depress a No. 3 key in the units bank of the counting section in order to enter the count of 3 shown in the first column of Example B. Following this the count is automatically entered in the count sections in columns 2, 3 and 4, because of a plurality of rollers or a skid operable in these three columns.

When it is desired to print a total of the count, the total key of the machine is depressed and the machine given a cycle of operation, whereupon the total of the count will be printed together with the total of amount in the register or crossfooter. And the total of the count will be printed as a positive total, regardless of whether the total in the register is printed as a positive or a true negative total. If the total of the count is taken in a column where the automatic count mechanism is not completely conditioned for operation, the operator need only depress the total key and take the total. But if a total of the count is desired in some column where the automatic count mechanism is operative, said automatic count mechanism must be disabled because, otherwise, the total would be incorrect, owing to the fact that the automatic count mechanism would index a unit in the units bank of the count section. A special key is provided for this purpose, as will be later explained.

Ordinarily the count is not printed in columns where checks are entered, such as columns 2, 3 and 4, the printing means for the count section being automatically blocked out by the usual carriage controlled hammer block described, for example, in Kilpatrick Patent No. 1,152,157 and Gascon No. 1,395,991.

"CHARGING" THE ITEM COUNTER

It is desirable to be able to "charge" the item counter, with a given number when desired. This may be necessary at the beginning of the count or it may be necessary during posting operations when the operator wishes to post a list or group of checks as a single amount. The present invention enables this to be easily done under different conditions.

If the item counter is to be "charged" in a column where the automatic count is not active, such as column 1 in Example B, it is merely necessary to index the number on the indexing devices for the item counter and to give the machine a cycle of operation. This indexing may, of course, occur at the same time that an amount is indexed on the amount keys; and the same machine cycle may be used to print and enter the item that is "charged" into the counter as well as the item that is entered in the register. If, however, the item counter is to be "charged" in a column where the automatic count is active, said automatic count must be temporarily disabled because, otherwise, a unit would be indexed in the units column of the count section to count the "charging" operation as an item, which, of course, is not desired.

The temporary disablement of the automatic count mechanism is accomplished as follows:

The machine is provided with a special key L, in the present instance located at the upper left hand corner of the keyboard which, when depressed, indexes a character printing sector so that the letter L will be printed to the right of the amount entered, details of this mechanism not having been illustrated herein but being shown in White 1,018,285. The lower end of key L has a stud and slot connection 120 to guide the same in sliding vertical movements and carries a stud 121 intermediate its ends positioned to engage a bell crank lever 122 pivoted to the machine side frame. The other arm of lever 122 carries a stud 123 engageable with a lever 124 which lever has a cam end 125 engageable with a pin 126 projecting outwardly from link 108. Link 108, it will be recalled, is moved downwardly when a roller 114 engages arm 116 in a selected carriage position or columnar position in which automatic counting is desired. When the key L is depressed and crank 122 is rocked clockwise cam 125 engages stud 126, raises the link 108, moves the slide 97 rearward, if said link and slide are not already in these positions, and latches them in said positions. In this manner depression of key L disables the automatic counting mechanism as well as causing printing of a character L. Near the end of the cycle of machine operation the key L is released by the ordinary key release devices, one of which, 7, together with the release shaft, is illustrated in Fig. 1.

*Normalizing the machine*

It is often desired to use a machine of the type disclosed for ordinary calculating or bookkeeping operations without having any automatic count of items. For this purpose a normalizing key N (Fig. 1) is provided which, in the present instance, is also located at the upper left hand corner of the keyboard. The normalizing key N is also guided by a stud and slot connection 120 for vertical movement and is provided at its lower end with a stud 130 engageable with lever 124 for causing the cam 125 on said lever to engage stud 126 to normalize the machine in the manner previously described. When key N is depressed, a notch in the key stem engages the lower keyboard plate and retains the key depressed until manually released. This key is also used to disable the automatic counting mechanism when it is desired to take a total in a column where the automatic count is normally active.

*Conditioning the automatic count during movement of the carriage*

In certain kinds of bookkeeping operations it is desirable to enter amounts in the amount section of the keyboard while the paper carriage is being tabulated or being returned across the machine. This speeds up the work in that the operator does not have to await the completion of the full movement or return of the carriage before beginning to enter an amount on the keys. To permit of counting items entered under these conditions, a slightly modified construction is employed which is shown in Fig. 5. For this purpose the auxiliary crank 91 is provided with a stud 135 placed to engage the rearward end of a cam arm 136 freely pivoted on the forward end of a lever 137 which latter lever is carried by a cross shaft 138. Lever 137 is provided with a stud 139 in position to be engaged by the cam 96 on slide 97.

When an amount is entered in the amount section of the keyboard while the carriage is moving and before it reaches a columnar position where a roll 114 conditions the counting mechanism for operation, shaft 81 is moved rearward by the depression of an amount key and is positioned directly under the lower cam surface of cam arm 136. When the carriage finally arrives in the predetermined columnar position in which a count is to be automatically made and a roll 114 rocks the arm 116, the slide 97 is moved forward, whereupon arm 137 is moved clockwise and the cam arm 136 is moved downward. As said arm moves downward its lower cam surface engages against shaft 81, which results in the cam arm 136 being rocked in a clockwise direction. As the arm 136 moves clockwise it engages stud 135 and rocks the lever 91 clockwise to move the No. 1 index wire 3 to active position. Thus, while the indexing of an item on the amount keys potentially indexes a portion of the automatic count mechanism, the completion of the indexing of the automatic count is accomplished by the carriage as it moves into its columnar position.

If the carriage is properly positioned before an amount is entered on the keyboard lever 136 will be moved downwardly into the rearward path of travel of shaft 81 and when an amount is entered in the keyboard, shaft 81 will act to rock lever 136 clockwise thereby moving the index wire 3 to proper position.

From the foregoing it will be clear that a machine has been provided that is capable of automatically counting subtract items or checks so that the count is registered additively, even though these checks are entered negatively in the machine, and this is accomplished without the addition of a special counter and without any substantial alteration in the regular machine construction. Not only can these subtract items be counted, but the results of the count can be printed at the option of the operator and the counting portion of the machine can be "charged" with a number whenever the operator desires. If the charging of the counting section takes place while the machine is conditioned to count automatically, the operator may temporarily disable the automatic count while charging the item counter. The count mechanism is normally inactive but is rendered active under the control of the amount indexing devices and the paper carriage, which results in counting only items that are indexed on the amount section and in counting these items only in selected columnar positions of the carriage. When desired, the operator can take the total of the count as well as the total of the amounts that have been accumulated in the amount section of the register and these two amounts will be printed. The count will be printed as a positive amount no matter whether the total from the amount section is printed as a positive total or a true negative total. Where the carriage controls are set up for counting items entered in a given column, the item counting section will be conditioned for counting items entered in the predetermined column, no matter whether the carriage has arrived at that column or is moving toward it from the next preceding column at the time the item is entered on the amount keys.

I claim:

1. A machine of the class specified, having first and second groups of movable actuators, means to reciprocate said actuators, first and second groups of register pinions, means to effect operative connection and disconnection of said groups of pinions with the respective groups of actuators, control means to condition said connecting means to effect total-taking connection of both of said groups of pinions with their respective groups of actuators simultaneously and for rotation of the pinions of said first group in one direction by their actuators during said total-taking connection, and means to condition said second group of pinions for rotation of the pinions thereof in either direction by their actuators during said total-taking connection in which the pinions of said first group are rotated in said one direction.

2. A machine of the class specified, having first and second groups of movable actuators, means to reciprocate said actuators, first and second groups of register pinions, means to effect amount-entering connection of said groups of pinions with the respective groups of actuators, amount-setting means to control excursions of actuators of said second group in amount-entering operations, means controlled by said amount-setting means to control entries in said first group of pinions, control means to condition said connecting means to effect total-taking connection of both of said groups of pinions with their respective groups of actuators simultaneously and for rotation of the pinions of said first group in one direction by their actuators during said total-taking connection, and means to condition said second group of pinions for rotation of the pinions thereof in either direction by their actuators during said total-taking connection in which the pinions of said first group are rotated in said one direction.

3. A machine of the class specified, having first and second groups of movable actuators, means to reciprocate said actuators, first and second groups of register pinions, means to effect amount-entering connection of said groups of pinions with the respective groups of actuators, amount-setting means to control excursions of actuators of said second group in amount-entering operations, means controlled by said amount-setting means to control excursions of an actuator of said first group in said amount-entering operations, means to disable the last-mentioned actuator-controlling means, amount-setting means to control actuators of said first group in amount-entering operations in which said last-mentioned actuator-controlling means is disabled, control means to condition said connecting means to effect total-taking connection of both of said groups of pinions with their respective groups of actuators simultaneously and for rotation of the pinions of said first group in one direction by their actuators during said total-taking connection, and means to condition said second group of pinions for rotation of the pinions thereof in either direction by their actuators during said total-taking connection in which the pinions of said first group are rotated in said one direction.

4. A machine of the class specified, having first and second groups of movable actuators, means to reciprocate said actuators, first and second groups of register pinions, means to effect amount-entering connection of both of said groups of pinions with their respective groups of actuators simultaneously and for rotation of the pinions of said first group in one direction by their actuators during said connection, means to condition said second group of pinions for rotation of the pinions thereof in either direction by their actuators during said connection in which the pinions of said first group are rotated in said one direction, and control means to condition said connecting means to effect total-taking connection of both of said groups of pinions with their respective groups of actuators simultaneously.

5. A machine of the class specified, having first and second groups of movable actuators, means to reciprocate said actuators, first and second groups of register pinions, means to effect amount-entering connection of both of said groups of pinions with their respective groups of actuators simultaneously and for rotation of the pinions of said first group in one direction by their actuators during said connection, means to condition said second group of pinions for rotation of the pinions thereof in either direction by their actuators during said connection in which the pinions of said first group are rotated in said one direction, amount-setting means to control excursions of actuators of said second group in amount-entering operations, means controlled by said amount-setting means to control excursions of an actuator of said first group in said amount-entering operations, and control means to condition said connecting means to effect total-taking connection of both of said groups of pinions with their respective groups of actuators simultaneously.

6. A machine of the class specified, having first and second groups of movable actuators, means to reciprocate said actuators, first and second groups of register pinions, means to effect amount-entering connection of both of said groups of pinions with their respective groups of actuators simultaneously and for rotation of the pinions of said first group in one direction by their actuators during said conection, means to condition said second group of pinions for rotation of the pinions thereof in either direction by their actuators during said connection in which the pinions of said first group are rotated in said one direction, amount-setting means to control excursions of actuators of said second group in amount-entering operations, means controlled by said amount-setting means to control excursions of an actuator of said first group in said amount-entering operations, means to disable the last-mentioned actuator-controlling means, amount-setting means to control actuators of said first group in amount-entering operations in which said last-mentioned actuator-controlling means is disabled, and control means to condition said connecting means to effect total-taking connection of both of said groups of pinions with their respective groups of actuators simultaneously.

7. A machine of the class specified, having first and second groups of movable actuators, means to reciprocate said actuators, first and second groups of register pinions, means to effect amount-entering connection of said groups of pinions with the respective groups of actuators simultaneously and for rotation of the pinions of said first group in one direction by their actuators during said amount-entering connection, control means to condition said connecting means to effect total-taking connection of both of said groups of pinions and their respective groups of actuators simultaneously and for rotation of the pinions of said first group in the opposite direction by their actuators during said total-taking connection, and means to condition said second group of pinions for rotation of the pinions thereof in either direction by their actuators during either of said connections.

8. A machine of the class specified, having first and second groups of movable actuators, means to reciprocate said actuators, first and second groups of register pinions, means to effect amount-entering connection of said groups of pinions with the respective groups of actuators simultaneously and for rotation of the pinions of said first group in one direction by their actuators during said amount-entering connection, amount-setting means to control excursions of actuators of said second group in amount-entering operations, means controlled by said amount-setting means to control excursions of an actuator of said first group in said amount-entering operations, control means to condition said connecting means to effect total-taking connection of both of said groups of pinions and their respective groups of actuators simultaneously and for rotation of the pinions of said first group in the opposite direction by their actuators during said total-taking connection, and means to condition said second group of pinions for rotation of the pinions thereof in either direction by their actuators during either of said connections.

9. A machine of the class specified, having first and second groups of movable actuators, means to reciprocate said actuators, first and second groups of register pinions, means to effect amount-entering connection of said groups of pinions with the respective groups of actuators simultaneously and for rotation of the pinions of said first group in one direction by their actuators during said amount-entering connection, amount-setting means to control excursions of actuators of said second group in amount-entering operations, means controlled by said amount-setting means to control excursions of an actuator of said first group in said amount-entering operations, means to disable the last-mentioned actuator-controlling means, amount-setting means to control actuators of said first group in amount-entering operations in which said last-mentioned actuator-controlling means is disabled, control means to condition said connecting means to effect total-taking connection of both of said groups of pinions and their respective groups of actuators simultaneously and for rotation of the pinions of said first group in the opposite direction by their actuators during said total-taking connection, and means to condition said second group of pinions for rotation of the pinions thereof in either direction by their actuators during either of said connections.

10. A machine of the class specified, having two groups of movable actuators, means to reciprocate said actuators, two groups of register pinions, a common support for both groups of pinions, means to move said support to effect connection and disconnection between both of said groups of pinions and the respective groups of actuators simultaneously, means on said support movable relative thereto and carrying the pinions of one of said groups, and means to effect relative movement between said common support and said relatively movable means to condition one of said groups of pinions for rotation of its pinions by their actuators in a direction either the same as or opposite to the direction of rotation of the pinions of the other of said groups by their actuators upon connection of the pinions with the actuators.

11. A machine of the class specified, having two groups of movable actuators, means to reciprocate said actuators, two groups of register pinions, a common support for both groups of pinions, means to move said support to effect connection and disconnection between both of said groups of pinions and the respective groups of actuators simultaneously, means on said support movable relative thereto and carrying the pinions of one of said groups movably relative to said common support and its group of actuators to condition said pinions for rotation in either direction by said actuators while said pinions are connected therewith, and means to move said movable means to shift said group of pinions relative to said common support and actuators.

12. In a machine of the class specified, having a movable register support, a first group of rotatable register pinions mounted on said support in fixed relation thereto, a second group of rotatable register pinions mounted on said support for movement relative thereto as a group and comprising a plurality of pairs of interconnected pinions, differential actuator means for each group of pinions, means for moving said support for engaging both groups of pinions simultaneously with their respective actuator means; and means for moving said second group of pinions relative to said support to position either one of the pinions of each of said pairs for engagement with the differential actuator means for said group.

13. A machine of the class specified, having a movable register support, a first group of rotatable register pinions mounted on said support in fixed relation thereto, a second group of rotatable register pinions mounted on said support for movement relative thereto as a group and comprising a plurality of pairs of interconnected pinions, differential actuator means for each group of pinions, means for moving said support for engaging both groups of pinions simultaneously with their respective actuator means, means for moving said second group of pinions relative to said support to position either one of the pinions of each of said pairs for engagement with the differential actuator means for said group, amount indexing means for the differential actuator means for one of said groups of pinions, and means controlled by said amount indexing means to control the other differential actuator means.

14. A machine of the class specified, having a traveling carriage, a movable register support, a first group of rotatable register pinions mounted on said support in fixed relation thereto, a second group of rotatable register pinions mounted on said support for movement relative thereto as a group and comprising a plurality of pairs of interconnected pinions, differential actuator means for each group of pinions, means for moving said support for engaging both groups of pinions simultaneously with their respective actuator means, means conditioned by said carriage in a predetermined position thereto to move said second group of pinions relative to said support to position a predetermined one of the pinions of each of said pairs for engagement with the differential actuator means for said group and conditioned by said carriage in another predetermined position thereof to move said second group of pinions relative to said support to position the other of the pinions of each of said pairs for engagement with the differential actuator means for said group, amount-indexing means for the differential actuator means for one of said groups of pinions, and means controlled by said carriage and by said amount indexing means to control the other differential actuator means.

15. A machine of the class specified, having first and second groups of movable actuators, a movable register support, first and second groups of rotatable register pinions carried by said support, means to move said support to effect connection and disconnection between pinions of both groups and actuators of their respective groups simultaneously, said first group of pinions being mounted on said support in fixed relation thereto for connection with the actuators of the first group upon each pinion-connecting movement of said support, a tumbling frame rockable on said support, said second group of pinions comprising pinions meshing in pairs and mounted in said tumbling frame for connection of a pinion of each of said pairs with actuators of said second group upon pinion-connecting movement of said support, and means to rock said tumbling frame on said support to position either pinion of each of said pairs for connection with said actuators of said second group upon said pinion-connecting movement of said support.

ROBERT L. MULLER.